United States Patent [19]

Grychtol

[11] 4,280,964
[45] Jul. 28, 1981

[54] BASIC DYES

[75] Inventor: Klaus Grychtol, Bad Durkheim, Fed. Rep. of Germany

[73] Assignee: BASF Aktiengesellschaft, Ludwigshafen, Fed. Rep. of Germany

[21] Appl. No.: 45,866

[22] Filed: Jun. 6, 1979

[30] Foreign Application Priority Data

Jun. 20, 1978 [DE] Fed. Rep. of Germany ....... 2826981

[51] Int. Cl.³ .................... C07C 121/78; C09B 23/14
[52] U.S. Cl. ................................ 260/465 D; 542/418; 542/421
[58] Field of Search ................... 260/465 D; 542/418, 542/427, 421

[56]  References Cited
U.S. PATENT DOCUMENTS

| | | | |
|---|---|---|---|
| 3,742,012 | 6/1973 | Bauman | 260/465 D |
| 4,017,482 | 4/1977 | Buell et al. | 542/427 |
| 4,063,882 | 12/1977 | Steiner | 260/465 D X |

Primary Examiner—Dolph H. Torrence
Attorney, Agent, or Firm—Oblon, Fisher, Spivak, McClelland & Maier

[57] ABSTRACT

Basic dyes of the general formula

A-B-A where
the substituents A independently of one another are a radical of the formula

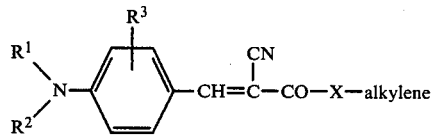

and
B is a bridge member,
and in the formula for A
$R^1$ and $R^2$ independently of one another are $C_1$–$C_4$-alkyl which is unsubstituted or substituted by hydroxyl, $C_1$–$C_4$-alkoxy, cyano, $C_1$–$C_4$-alkoxycarbonyl, di-$C_1$–$C_4$-alkylamino, benzyl-($C_1$–$C_4$-alkyl)-amino, chlorine or bromine, or are cyclohexyl, benzyl, phenylethyl or phenyl, or
$R^1$ and $R^2$ together with the nitrogen are pyrrolidino, piperidino, morpholino or N-methylpiperazino,
$R^3$ is hydrogen, chlorine, bromine, methyl, ethyl, methoxy, ethoxy or nitro,
X is oxygen, imino or $C_1$–$C_4$-alkylimino and
alkylene is of 2 to 6 carbon atoms and is straight or branched.

The novel dyes are mainly used for dyeing paper pulps.

2 Claims, No Drawings

BASIC DYES

BACKGROUND OF THE INVENTION

Field of the Invention

The present invention relates to basic dyes.

SUMMARY OF THE INVENTION

According to the invention there are provided compounds of the general formula I $$A-B-A \qquad I$$

where
the substituents A independently of one another are each a radical of the formula

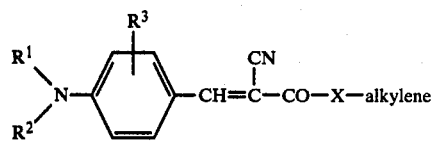

and
B is a bridge member,
and in the formula for A
$R^1$ and $R^2$ independently of one another are $C_1-C_4$-alkyl which is unsubstituted or substituted by hydroxyl, $C_1-C_4$-alkoxy, cyano, $C_1-C_4$-alkoxycarbonyl, di-$C_1-C_4$-alkylamino, benzyl-($C_1-C_4$-alkyl)amino, chlorine or bromine, or are cyclohexyl, benzyl, phenylethyl or phenyl, or
$R^1$ and $R^2$ together with the nitrogen are pyrrolidino, piperidino, morpholino or N-methylpiperazino,
$R^3$ is hydrogen, chlorine, bromine, methyl, ethyl, methoxy, ethoxy or nitro,
X is oxygen, imino or $C_1-C_4$-alkylimino and
alkylene is of 2 to 6 carbon atoms and is straight or branched.

DESCRIPTION OF THE PREFERRED EMBODIMENTS

Specific examples of radicals $R^1$ and $R^2$, in addition to those already mentioned, are $C_3H_7$, $C_4H_9$, $C_2H_4OH$, $CH_2CHOHCH_3$, $C_2H_4OCH_3$, $C_2H_4OC_2H_5$, $C_2H_4OC_3H_7$, $C_2H_4OC_4H_9$,

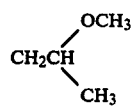

$C_2H_4CN$, $C_2H_4COOCH_3$, $C_2H_4COOC_4H_9$, $C_2H_4Cl$ and $C_2H_4Br$ and preferably $CH_3$, $C_2H_5$, $C_2H_4N(CH_3)_2$, $C_2H_4N(C_2H_5)_2$, $C_2H_4N(C_3H_7)_2$, $C_2H_4N(C_4H_9)_2$,

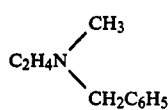

$CH_2CN$ and $C_6H_5$.

Further preferred radicals representing $R^1$ and $R^2$ together are

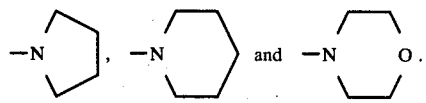

Examples of alkylene radicals are $-C_2H_4-$ and

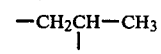

Preferred bridge members are nitrogen-terminated.
A particularly suitable bridge member B is the radical of the formula

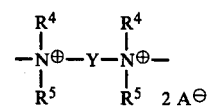

where $R^4$ and $R^5$ independently of one another are $C_1-C_4$-alkyl or benzyl,

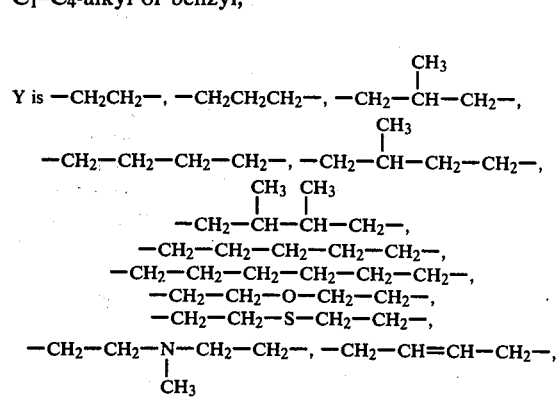

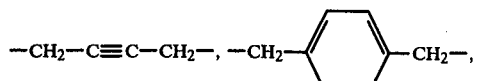

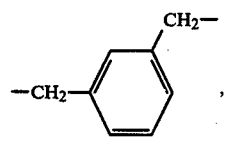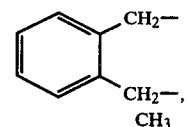

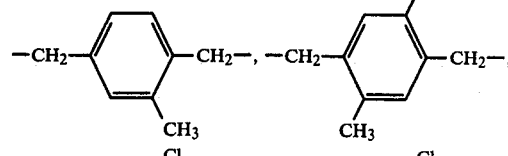

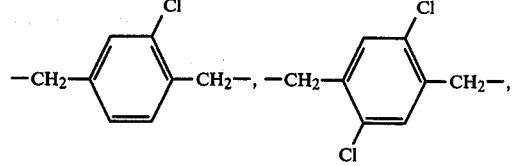

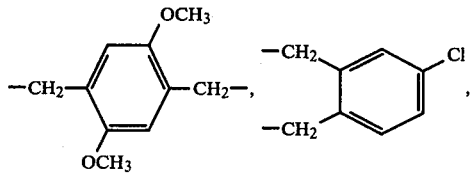

-continued

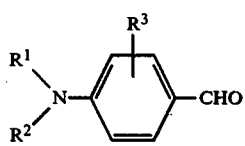

and $A^\ominus$ is an anion or one equivalent of an anion.

Examples of anions $A^\ominus$ are chloride, bromide, bisulfate, sulfate, aminosulfate, nitrate, dihydrogen-phosphate, bicarbonate, methosulfate, tetrachlorozincate, chloroacetate, glycolate, acetate, propionate, maleate, benzoate, succinate, citrate and ethylene-bis-iminoacetate.

A compound of the formula I may be prepared by reacting a compound of the formula II

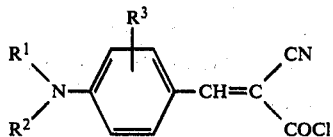

with a compound of the formula III

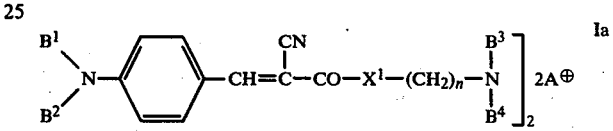

or reacting a compound of the formula IV

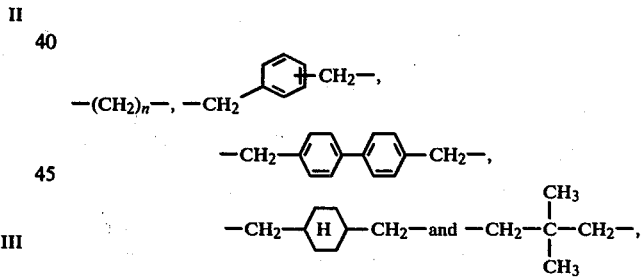

with a compound of the formula V

HX-alkylene-B-alkylene-XH    V $R^1, R^2, R^3, X, B$ and alkylene having the above meanings.

Details of the reactions may be found in the Examples, where parts and percentages are by weight, unless stated otherwise.

The compounds of the formula I are yellow and are especially suitable for dyeing paper pulps, for example wood-free and wood-containing sulfite and sulfate pulp. Some of the compounds are direct dyes and are substantially exhausted from the dyebath. The dyes are furthermore readily bleachable.

Dyes of particular importance are those of the formula Ia

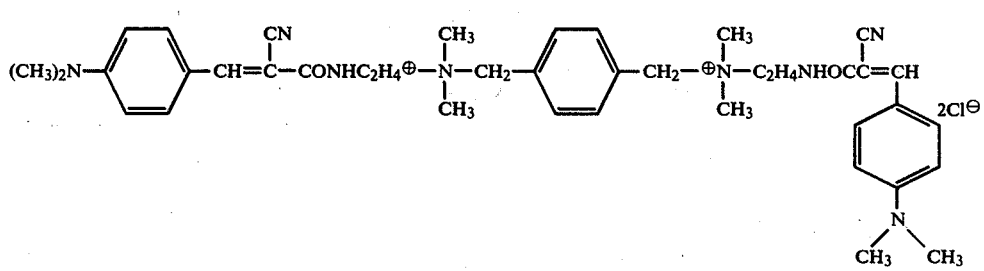

where
$B^1$ and $B^2$ are methyl, ethyl, benzyl, phenyl or di-$C_1$-$C_4$-alkylaminoethyl,
$B^3$ and $B^4$ are methyl, ethyl, propyl or benzyl,
n is 2 or 3,
$X^1$ is oxygen or imino and
Y and $A^\ominus$ have the meanings given above.
Preferred radicals Y are $-(CH_2)_n-$, $-CH_2-\!\!\begin{array}{c}\phantom{x}\end{array}\!\!-CH_2-$, $-CH_2-\!\!\begin{array}{c}\phantom{x}\end{array}\!\!-\!\!\begin{array}{c}\phantom{x}\end{array}\!\!-CH_2-$, $-CH_2-\!\!\begin{array}{c}H\end{array}\!\!-CH_2-$ and $-CH_2-\overset{CH_3}{\underset{CH_3}{C}}-CH_2-$, where n is from 2 to 10.

EXAMPLE 1

15.5 parts of cyanoacetic acid dimethylaminoethylene amide (obtained from the methyl ester by reaction with N,N-dimethylethylenediamine, boiling point 140°–150° C./1 mm Hg) and 8.8 parts of p-xylylene dichloride in 50 parts of ethylene glycol monomethyl ether are boiled under reflux until a sample diluted with water gives a clear solution. 15 parts of p-dimethylaminobenzaldehyde and one part of piperidine are then added and the mixture is kept at 120° C. for two hours. When it has cooled, it is diluted with acetone and the product is filtered off. Yield: 40 parts, melting point 95° C. (with decomposition). The dye produces greenish yellow colorations on 60/40 groundwood/unbleached sulfite cellulose pulp and bleached sulfite pulp. The waste water only shows a pale yellow color.

Yellow dyes having similar properties are obtained by employing the following aldehydes: N,N-diethyl-, N,N-dibutyl-, N,N-dibenzyl-, N-phenyl-N-methyl-, N-ethyl-N-benzyl-, N-methyl-N-cyanomethyl-, N-ethyl-N-cyanoethyl-, N-ethyl-N-β-dimethylaminoethyl-, m-methoxy-N,N-diethyl-, m-chloro-N,N-dibenzyl-, m-methyl-N,N-diethyl- and m-hydroxy-N,N-diethyl-aminobenzaldehyde, as well as p-morpholino-, p-pyrrolidino- and p-piperidino-benzaldehyde.

Yellow dyes are also obtained if N,N-dimethylethylenediamine is replaced by the following amino compounds: H$_2$N—C$_2$H$_4$—N(C$_2$H$_5$)$_2$, H$_2$N—C$_2$H$_4$—N(C$_3$H$_7$)$_2$, H$_2$N—C$_2$H$_4$—N(CH$_2$C$_6$H$_5$)$_2$,

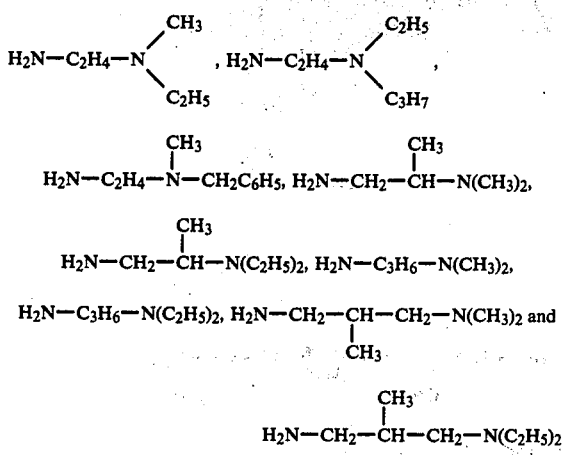

Yellow paper dyes are also obtained if p-xylylene dichloride is replaced by the following bis-halomethyl compounds:

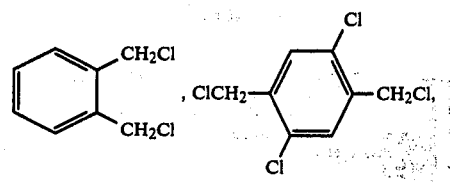

-continued

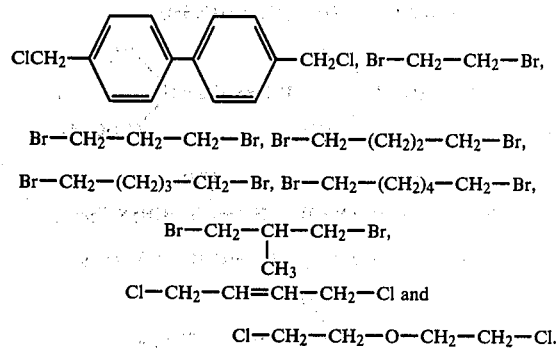

Br—CH$_2$—CH$_2$—CH$_2$—Br, Br—CH$_2$—(CH$_2$)$_2$—CH$_2$—Br,

Br—CH$_2$—(CH$_2$)$_3$—CH$_2$—Br, Br—CH$_2$—(CH$_2$)$_4$—CH$_2$—Br,

Br—CH$_2$—CH—CH$_2$—Br,
　　　　　｜
　　　　　CH$_3$

Cl—CH$_2$—CH=CH—CH$_2$—Cl and

Cl—CH$_2$—CH$_2$—O—CH$_2$—CH$_2$—Cl.

EXAMPLE 2

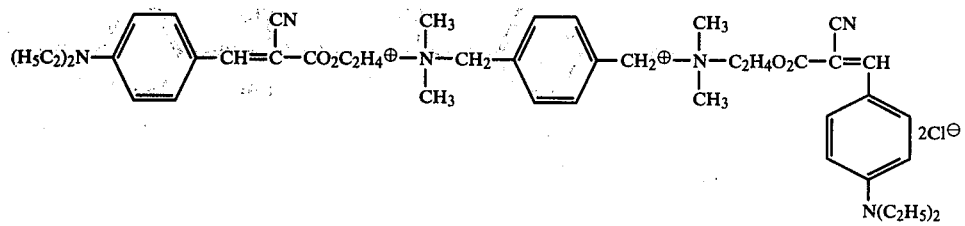

30.5 parts of acetic anhydride and 8.5 parts of cyanoacetic acid are stirred for one hour at 50° C. 17.7 parts of the compound of the formula

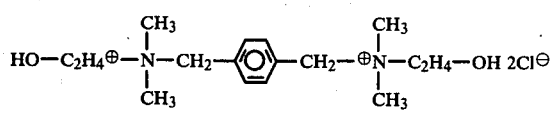

and 17.7 parts of p-diethylaminobenzaldehyde are then introduced and the mixture is heated for two hours at 80°–90° C. At that stage, a sample of the dye is completely water-soluble. The liquid dye is packaged. It dyes paper in brilliant greenish yellow hues and the waste water which remains is only slightly colored.

The bis-quaternary compound used is obtained as follows: 180 parts of N,N-dimethylethanolamine and 175 parts of p-xylylene dichloride in 500 parts of ethylene glycol monomethyl ether are refluxed for five hours. At that stage, a sample of the reaction mixture gives a clear solution in water. When the solution has cooled, it is diluted with acetone and the product is filtered off and dried.

Yield 351 parts, melting point 241°–244° C.

If N,N-diethylethanolamine is employed, the bis-diethylamino compound, melting point 239°–241° C., is obtained, again in very good yield.

The dye may also be prepared as follows:

p-Diethylaminobenzaldehyde is condensed with cyanoacetic acid in pyridine in the presence of piperidine, the acid is converted, by means of thionyl chloride in toluene, to the acid chloride, and the latter is then condensed with the bis-quaternary aminohydroxy compound.

Yellow paper dyes are also obtained if the aldehydes mentioned in Example 1, the bis-halomethyl compounds and the following aminohydroxy compounds are employed:

HO—C2H4—N(C2H5)2, HO—C2H4—N(C3H7)2,

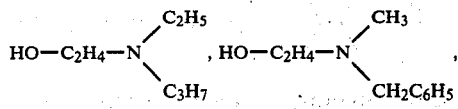

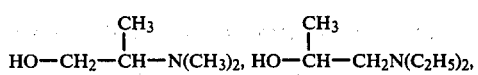

HO—C3H6—N(CH3)2, HO—C3H6—N(C2H5)2,

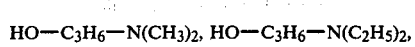

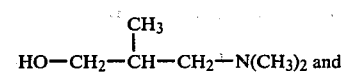

which leave very little coloration in the waste water are again obtained.

30.5 parts

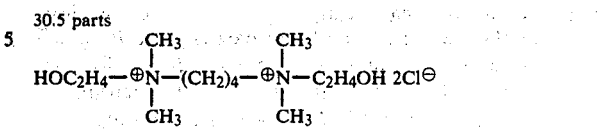

Melting point 283–285° C.

30.3 parts

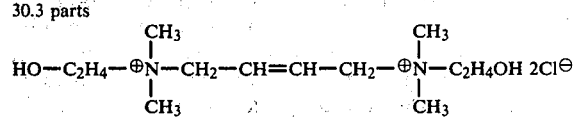

Melting point 240–243° C.

EXAMPLE 4

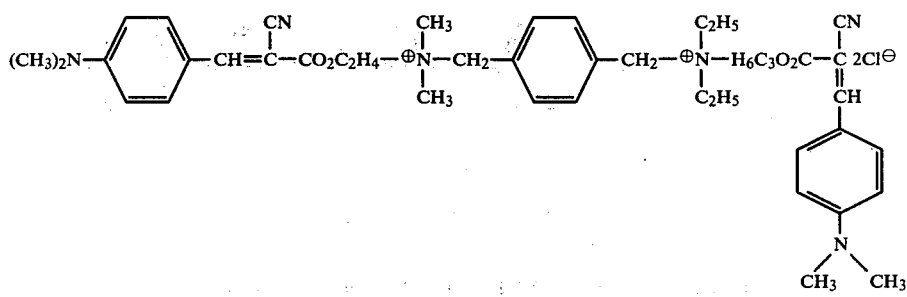

61 parts of acetic anhydride and 17 parts of cyanoacetic acid are stirred for one hour at 50° C. 38.5 parts of the compound of the formula

EXAMPLE 3

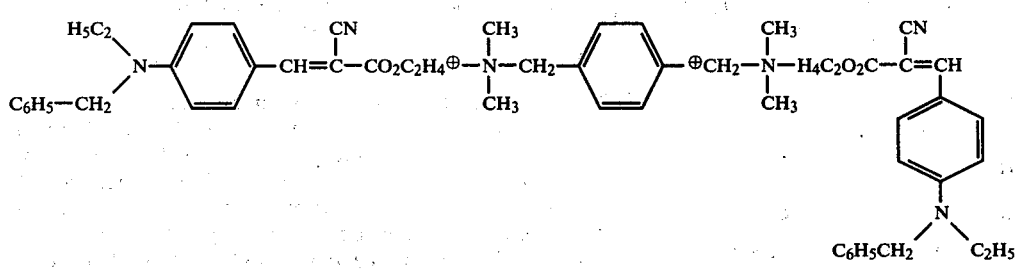

61 parts of acetic anhydride and 17 parts of cyanoacetic acid are stirred for one hour at 50° C. 35.3 parts of the compound of the formula

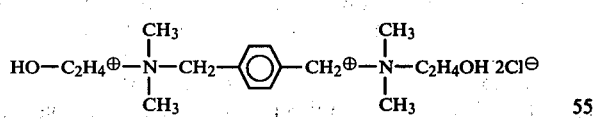

are added to the mixed anhydride and the mixture is stirred at 40° C. until a clear solution has been produced. 48 parts of N-ethyl-N-benzyl-p-aminobenzaldehyde are then added and the mixture is heated to 80° C. and stirred until a sample of the dye gives a clear solution in water. The liquid dye is packaged and is diluted, when desired, with water, acetic acid or glycols.

The dye produces greenish yellow dyeings on bleached and unbleached pulps, with very little coloration of the waste water.

If instead of the above bis-quaternary alcohol the components shown below are used, yellow paper dyes

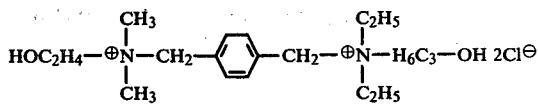

are added and thereafter the procedure described in Example 3 is followed.

A liquid dye is obtained, which gives yellow dyeings on bleached and unbleached pulps, with little coloration of the waste water.

EXAMPLE 5

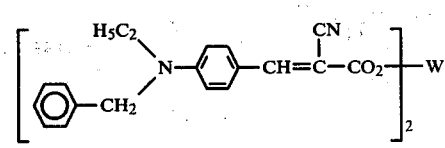

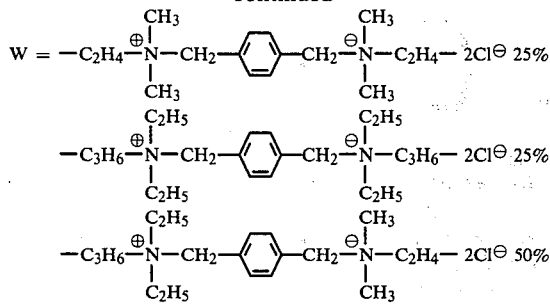

4.5 parts of dimethylethanolamine and 6.7 parts of diethylpropanolamine are reacted with 17.5 parts of p-xylylene dichloride as described in Example 2 and the product is added to a mixture, at 50° C., of 61 parts of acetic anhydride and 17 parts of ethyl cyanoacetate. The batch is then stirred at 50° C. until the product is water-soluble, after which 48 parts of N-ethyl-N-benzyl-p-aminobenzaldehyde are added and the batch is heated to 80° C. The solubility in water is then again tested, and the stable liquid dye formulation is packaged.

Valuable liquid formulations are also obtained if mixtures of aldehydes and/or bridge components are employed.

I claim:

1. A basic dye of the general formula

where
the substituents A independently of one another are each a radical of the formula

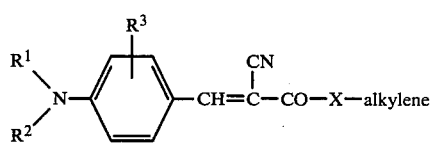

and
B is a bridge member, of the formula

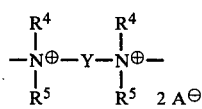

where $R^4$ and $R^5$ independently of one another are $C_1$-$C_4$-alkyl or benzyl, $A^{\ominus}$ is an anion and Y is $-CH_2CH_2-$, $-CH_2CH_2CH_2-$, $-CH_2-\underset{CH_3}{\underset{|}{CH}}-CH_2-$, $-CH_2-CH_2-CH_2-CH_2-$, $-CH_2-\underset{CH_3}{\underset{|}{CH}}-CH_2-CH_2-$, $-CH_2-\underset{CH_3}{\underset{|}{CH}}-\underset{CH_3}{\underset{|}{CH}}-CH_2-$, $-CH_2-CH_2-CH_2-CH_2-CH_2-$,
$-CH_2-CH_2-CH_2-CH_2-CH_2-CH_2$,
$-CH_2-CH_2-O-CH_2-CH_2-$,
$-CH_2-CH_2-S-CH_2-CH_2-$, $-CH_2-CH_2-\underset{CH_3}{\underset{|}{N}}-CH_2-CH_2-$, $-CH_2-CH=CH-CH_2-$,

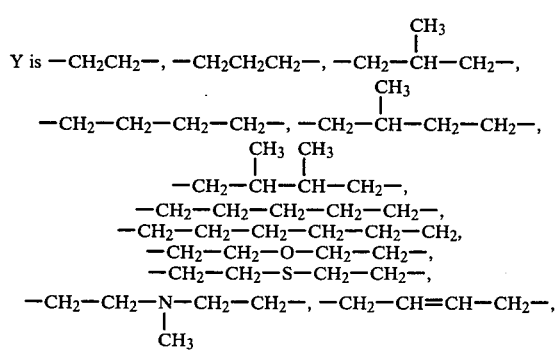

and in the formula for A
$R^1$ and $R^2$ independently of one another are $C_1$-$C_4$-alkyl which is unsubstituted or substituted by hydroxyl, $C_1$-$C_4$-alkoxy, cyano, $C_1$-$C_4$-alkoxycarbonyl, di-$C_1$-$C_4$-alkyl-amino, benzyl-($C_1$-$C_4$-alkyl)amino, chlorine or bromine, or are cyclohexyl, benzyl, phenylethyl or phenyl, or
$R^1$ and $R^2$ together with the nitrogen are pyrrolidino, piperidino, morpholino or N-methylpiperazino,
$R^3$ is hydrogen, chlorine, bromine, methyl, ethyl, methoxy, ethoxy or nitro, X is oxygen, imino or $C_1$–$C_4$-alkylimino and
alkylene is of 2 to 6 carbon atoms and is straight or branched.
2. The basic dye of claim 1, of the formula Ia
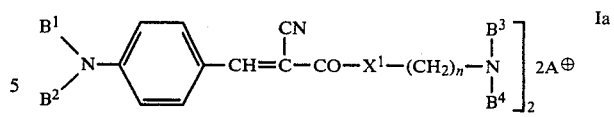
where
- $B^1$ and $B^2$ are methyl, ethyl, benzyl, phenyl or di-$C_1$–$C_4$-alkylaminoethyl,
- $B^3$ and $B^4$ are methyl, ethyl, propyl or benzyl,
- n is 2 or 3,
- $X^1$ is oxygen or imino and
- Y and $A^{\ominus}$ have the meanings given in claim 1.
* * * * *